United States Patent Office 3,393,150
Patented July 16, 1968

3,393,150
METHODS OF SCALE INHIBITION
Paul H. Ralston, Bethel Park, Pa., assignor to
Calgon Corporation
No Drawing. Filed Aug. 11, 1967, Ser. No. 659,851
18 Claims. (Cl. 210—58)

ABSTRACT OF THE DISCLOSURE

Certain mono- and diamine methylene phosphonates of low solubility are disclosed as threshold scale inhibitors.

Background of the invention

This invention relates to methods of inhibiting scale formation and/or the formation of solid scale-forming salts in water or brine comprising adding to said water or brine small amounts of certain amino phosphonate compounds.

Most commercial water contains alkaline earth metal cations, such as calcium, barium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction product, a solid phase of calcium carbonate will form.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying system, they form scale. The scale prevents effective heat transfer, interferes with fluid flow, facilitates corrosive processes, and harbors bacteria. This scale is an expensive problem in many industrial water systems, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agents as cation, and these are not always desirable or economical.

More than twenty-five years ago it was discovered that certain inorganic poly-phosphates would prevent such precipitation when added in amounts far less than the concentrations needed for sequestering or chelating. See, for example, Hatch and Rice, "Industrial Engineering Chemistry," vol. 31, page 51 at 53; Reitemeier and Buehrer, "Journal of Physical Chemistry," vol. 44, No. 5, page 535 at 536 (May 1940); Fink and Richardson, U.S. Patent 2,358,222; and Hatch, U.S. Patent 2,539,305. When a precipitation inhibitor is present in a potentially scale-forming system at a markedly lower concentration than that required for sequestering the scale forming cation, it is said to be present in "threshold" amounts. Generally, sequestering takes place at a weight ratio of threshold active compound to scale-forming cation component of greater than about ten to one, and threshold inhibition generally takes place at a weight ratio of threshold active compound to scale-forming cation component of less than about 0.5 to 1.0. Where the scale-forming compound is an alkaline earth metal carbonate, sulfate, oxalate, phosphate, fluoride or silicate, I have found that the threshold active compounds of my invention will inhibit their precipitation from solution when added to the solution in threshold amounts of up to about 100 parts by weight per million parts water (although I prefer up to about 25 p.p.m. for most commercial purposes).

The "threshold" concentration range can be demonstrated in the following manner. When a typical scale-forming solution containing the cation of a relatively insoluble compound is added to a solution containing the anion of the relatively insoluble compound and a very small amount of a threshold active inhibitor, the relatively insoluble compound will not precipitate even when its normal equilibrium concentration has been exceeded. If more of the threshold active compound is added, a concentration is reached where turbidity or a precipitate of uncertain composition results. As still more of the threshold active compound is added, the solution again becomes clear. This is due to the fact that threshold active compounds in high concentrations also act as sequestering agents. Thus, there is an intermediate zone between the high concentrations at which threshold active compounds sequester the cations of relatively insoluble compounds and the low concentrations at which they act as threshold inhibitors. Therefore, one could also define "threshold" concentrations as all concentrations of threshold active compounds below that concentration at which this turbid zone of precipitate is formed.

The polyphosphates are generally effective threshold inhibitors for many scale-forming compounds at temperatures below 100° F. But after prolonged periods at higher temperatures, they lose some of their effectiveness. Moreover, in an acid solution, they revert to ineffective or less effective compounds.

In my copending patent application Ser. No. 409,300, filed Nov. 5, 1964, now U.S. Patent No. 3,336,221, I have disclosed that the organic amino methylene phosphonates of the formula

where A is

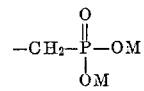

B is A or —CH$_2$CH$_2$OH, C is B or

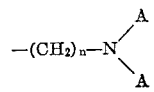

and $n$ is 1, 2 or 3, have the ability to inhibit scale formation in water systems in threshold quantities. The disclosure is concerned only with such compositions in which M is defined as H, NH$_4$, alkali metal, or combinations thereof. These compositions are very useful under many conditions because they are readily soluble.

Summary of the invention

There are many instances in which threshold inhibiting compositions are more desirable if they are slowly soluble and/or of low solubility. I have accordingly developed a method of inhibiting scale formation useful under circumstances in which it is desirable to feed small quantities of threshold active composition over relatively long periods of time.

The compositions I employ are water-soluble salts of the formula

where A is

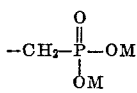

B is A or —$CH_2CH_2OH$, C is B or

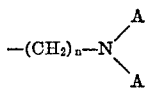

and $n$ is preferably 1, 2 or 3, but maybe any number from 1 to 6.

In the above formula, at least one of the M's represents a valance bond of a polyvalent metal and the other M is independently hydrogen, alkali metal or ammonia. In other words, my invention employs the water-soluble salts of the mono and diamino methylene phosphonates of the above description in which at least one of the M's represents a polyvalent metal.

I employ the above compounds in threshold amounts. Preferably no more than 100 p.p.m. need be used, and in a weight ratio of inhibitor compound to cation component of scale-forming salt not in excess of 0.5 to 1. Most commercial conditions will require no more than 25 p.p.m.

Of the polyvalent metals, I prefer to use iron, calcium, zinc and magnesium. Not only are the compounds formed from these metals effective inhibitors at room temperatures, but they are also effective at elevated temperatures. Moreover, they retain their effectiveness in acid and salt solution.

I have performed numerous experiments at elevated temperatures for various lengths of time to demonstrate the effectiveness of different concentrations and forms of these amino methylphosphonic salts in inhibiting the precipitation of various scale-forming salts. In these experiments, I mixed solutions of two soluble salts in the presence of the amino methylphosphonic acid salt of polyvalent metal to form a solution containing a relatively insoluble salt at several times its equilibrium concentration. As a control, each experiment was also conducted in the absence of a precipitation inhibitor.

By titrating a small amount of the solution and thereby determining the concentration of one of its soluble components, the amount of precipitate formed in a particular test solution at a particular time was calculated. I used the well-known Schwarzenbach titration and determined the concentration of the alkaline earth metal cation. At the end of the experiment, the concentration of soluble cation in each control solution, as determined by titration, was considered to be 0% inhibition. If no precipitate formed in an inhibited test solution and it therefore contained all of its original cation content, it was considered to be 100% inhibited. Titration results intermediate to the 0% and 100% inhibition values were directly related to these extremes and converted to percent inhibition.

For example, in the case of the scale-forming salt, calcium carbonate ($CaCO_3$), I added, with agitation, 5 ml. of 0.1 M $CaCl_2$ to a solution containing 490 ml. distilled water and 5 ml. 0.1 M $Na_2CO_3$. In the control experiment no inhibitor was present in the test solution. In other experiments, various amounts of a scale inhibitor were present prior to the addition of the calcium chloride. At the end of the storage period, the control solution contained both soluble calcium and calcium precipitated as calcium carbonate. Titration of the soluble calcium in the control solution by the familiar Schwarzenbach method indicated the concentration of calcium carbonate in solution. This calcium carbonate concentration was the equilibrium concentration under the conditions of the test (pH, temperature, ionic strength, etc.).

When a few parts per million of my scale inhibitor were present in the test described above, more calcium ion (and therefore more carbonate ion) remained in solution and less calcium carbonate precipitated at the end of the storage test. This greater concentration was confirmed by the titration of calcium in the solutions and related to the equilibrium concentration of the untreated control solution. In the tables, "No. Times Equilibrium Concentration" represents the relative magnitude of the soluble scale-forming salt concentration in the presence of an inhibitor to the scale-forming salt concentration in the absence of an inhibitor at the temperature of the test. Thus, 4.9 times the equilibrium concentration of $CaCO_3$ at 185° F. means that the concentration of $CaCO_3$ in the inhibited solution was 4.9 times the equilibrium concentration of the control solution at 185° F.

Tables I–V demonstrate the effectiveness of various inhibitors of my invention in inhibiting the precipitation of various scale-forming compounds after 24 hours storage at various temperatures. The threshold concentrations used in these tables are representative of effective inhibitor concentrations but not necessarily minimum concentrations.

TABLE I.—INHIBITION OF PRECIPITATION OF CALCIUM SULFATE AFTER 24 HOURS' STORAGE AT 130° F.

[6,650 p.p.m. $CaSO_4$ (2.2×equilibrium concentration)]

| Inhibitor | Conc. (p.p.m.) | Percent Inhibition |
|---|---|---|
| $N(CH_2PO_3)_3CaNa_3H$ | 10 | 100 |
|  |  | 0 |

TABLE II.—INHIBITION OF PRECIPITATION OF CALCIUM SULFATE AFTER 24 HOURS' STORAGE AT 150° F.

[6,720 p.p.m. $CaSO_4$ (2.4×equilibrium concentration)]

| Inhibitor | Conc. (p.p.m.) | Percent Inhibition |
|---|---|---|
| $N_2(CH_2)_2(CH_2PO_3)_4Zn_2Na_2H_2$ | 2.8 | 91 |
| $N_2(CH_2)_6(CH_2PO_3)_4Zn_2Na_2H_2$ | 5.6 | 97 |
| $N(CH_2PO_3)_3CaNa_3H$ | 5.0 | 100 |

TABLE III.—INHIBITION OF PRECIPITATION OF CALCIUM CARBONATE AFTER 24 HOURS' STORAGE AT 150° F.

[95 p.p.m. $CaCO_3$ (3.6×equilibrium concentration)]

| Inhibitor | Conc. (p.p.m.) | Percent Inhibition |
|---|---|---|
| $N(CH_2PO_3)_3Mg_2NaH$ | 0.5 | 100 |
| $N(CH_2PO_3)_3Mg_2NaH$ | 0.25 | 81 |
| $N(CH_2PO_3)_3Mg_2NaH$ | 0.10 | 50 |
| $N(CH_2PO_3)_3Fe^{+++}H_3$ | 0.45 | 93 |
| $N(CH_2PO_3)_3Zn_2H_2$ | 1.0 | 85 |
| $N_2(CH_2)_2(CH_2PO_3)_4Zn_2Na_2H_2$ | 0.3 | 62 |
| $N_2(CH_2)_6(CH_2PO_3)_4Zn_2Na_2H_2$ | 0.55 | 97 |

TABLE IV.—INHIBITION OF PRECIPITATION OF BARIUM SULFATE AFTER 24 HOURS' STORAGE AT 150° F.

[56 p.p.m. $BaSO_4$ (8×equilibrium concentration)]

| Inhibitor | Conc. (p.p.m.) | Percent Inhibition |
|---|---|---|
| $N(CH_2PO_3)_3CaNa_3H$ | 1.0 | 100 |

TABLE V.—INHIBITION OF PRECIPITATION OF MAGNESIUM SILICATE AFTER 24 HOURS' STORAGE AT 150° F.

[53 p.p.m. $3MgO2SiO_22H_2O$ (1.6 equilibrium concentration—33 p.p.m.)]

| Inhibitor | Conc. (p.p.m.) | Percent Inhibition |
|---|---|---|
| $N(CH_2PO_3)_3CaNa_3H$ | 6.8 | 55 |

Thus, it is seen that my invention relates to methods of inhibiting precipitation and scale formation in aqueous media, comprising adding thereto the above described amino methylphosphonates in threshold amounts. I do not intend to be limited to the specific salts, methods, temperatures, concentrations, and lengths of time disclosed herein for illustrative purposes. My invention may be otherwise practiced and embodied within the scope of the following claims.

I claim:

1. A method of inhibiting the precipitation of scale-forming salts in a water system comprising adding to said system no more than a threshold amount of a compound of the general formula

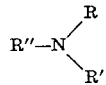

where R is

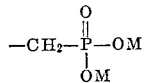

R' is selected from the group consisting of R and —CH$_2$CH$_2$OH, and R" is selected from the group consisting of R, —CH$_2$CH$_2$OH, and

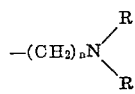

where at least one M represents a valence bond of a polyvalent metal and the balance are independently selected from the group consisting of H, NH$_4$ alkali metal, and n is a whole number from 1 to 6.

2. A method of inhibiting the precipitation of scale-forming salts in a water system comprising adding to said system no more than a threshold amount of a compound of the formula

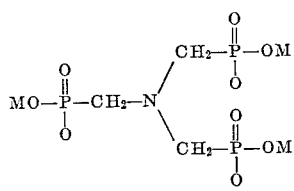

where at least one M represents a valence bond of a polyvalent metal and the balance are independently selected from the group consisting of H, NH$_4$, and alkali metal.

3. A method of inhibiting the precipitation of scale-forming salts in a water system comprising adding to said system no more than a threshold amount of a compound of the formula

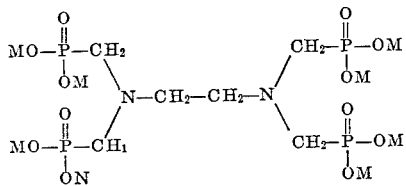

where at least one M represents a valence bond of a polyvalent metal and the balance are independently selected from the group consisting of H, NH$_4$ and alkali metal.

4. A method of inhibiting the precipitation of scale-forming salts in a water system comprising adding to said system no more than a threshold amount of a compound of the formula

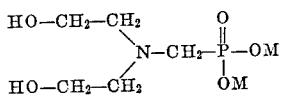

where at least one M represents a valence bond of a polyvalent metal and the balance are independently selected from the group consisting of H, NH$_4$ and alkali metal.

5. A method of inhibiting the deposition of scale-forming alkaline earth metal carbonates, sulfates, oxalates, phosphates, fluorides, and silicates on a metal surface in contact with solutions thereof comprising adding to said solutions a compound of the formula

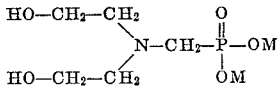

where at least one M represents a valence bond of a polyvalent metal and the balance are independently selected from the group consisting of H, NH$_4$ alkali metal, the amount of said compound added being no more than a threshold amount up to about 100 p.p.m., and in a weight ratio of said compound to the cation component of said scale-forming salts not in excess of 0.5 to 1.

6. Method of claim 5 in which the concentration of said compound in said system does not exceed about 25 parts by weight per million parts of water.

7. Method of claim 5 in which the polyvalent metal is selected from the group consisting of calcium, magnesium, zinc and iron.

8. Method of claim 7 in which the concentration of said compound in said system does not exceed about 25 parts by weight per million parts of water.

9. A method of inhibiting the deposition of scale-forming alkaline earth metal carbonates, sulfates, oxalates, phosphates, fluorides and silicates on a metal surface in contact with solutions thereof comprising adding to said solutions a compound of the general formula

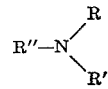

where R is

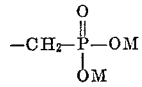

R' is selected from the group consisting of R and —CH$_2$CH$_2$OH, and R" is selected from the group consisting of R, —CH$_2$CH$_2$OH, and

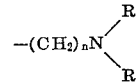

where at least one M represents a valence bond of a polyvalent metal and the balance are independently selected from the group consisting of H, NH$_4$, alkali metal, n is a whole number from 1 to 6, the amount of said compound added being no more than a threshold amount up to about 100 p.p.m., and in a weight ratio of said compound to the cation component of said scale-forming salts not in excess of 0.5 to 1.

10. Method of claim 9 in which the concentration of said compound in said system does not exceed about 25 parts by weight per million parts of water.

11. A method of inhibiting the deposition of scale-forming alkaline earth metal carbonates, sulfates, oxalates, phosphates, fluorides, and silicates on a metal surface in contact with solutions thereof comprising adding to said solutions a compound of the formula

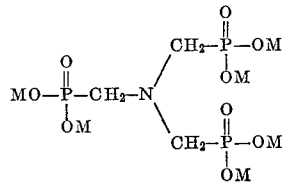

where at least one M represents a valence bond of a polyvalent metal and the balance are independently selected from the grounp consisting of H, NH$_4$, alkali metal, the amount of said compound added being no more than a threshold amount up to about 100 p.p.m., and in a weight ratio of said compound to the cation component of said scale-forming salts not in excess of 0.5 to 1.

12. A method of inhibiting the deposition of scale-forming alkaline earth metal carbonates, sulfates, oxalates, phosphates, fluorides and silicates on a metal surface in contact with solutions thereof comprising adding to said solutions a compound of the formula

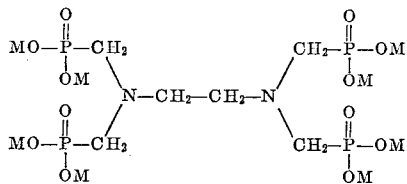

where at least one M represents a valence bond of a polyvalent metal and the balance are independently selected from the group consisting of H, NH$_4$ and alkali metal, the amount of said compound added being no more than a threshold amount up to about 100 p.p.m., and in a weight ratio of said compound to the cation component of said scale-forming salts not in excess of 0.5 to 1.

13. A method of inhibiting the precipitation of scale-forming salts in an aqueous system comprising adding to said system a compound of the general formula

where R is

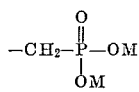

R' is selected from the group consisting of R and —CH$_2$CH$_2$OH, and R" is selected from the group consisting of R, —CH$_2$CH$_2$OH, and

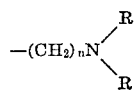

where at least one M represents a valence bond of a polyvalent metal and the balance are independently selected from the group consisting of H, NH$_4$, alkali metal, $n$ is a whole number from 1 to 6, the amount of said compound added being a threshold amount in a weight ratio of said compound to the cation component of said scale forming salts not in excess of 0.5 to 1, and which amount is less than that which would cause turbidity removable by a sequestering amount of said compound.

14. A method of inhibiting the precipitation of scale-forming salts in an aqueous system comprising adding to said system a compound of the formula

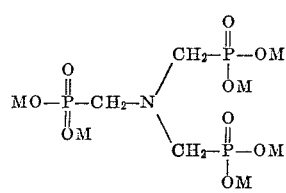

where at least one M represents a valence bond of a polyvalent metal and the balance are independently selected from the group consisting of H, NH$_4$, alkali metal, the amount of said compound added being a threshold amount in a weight ratio of said compound to the cation component of said scale-forming salts not in excess of 0.5 to 1, and which amount is less than that which would cause turbidity removable by a sequestering amount of said compound.

15. A method of inhibiting the precipitation of scale-forming salts in an aqueous system comprising adding to said system a compound of the formula

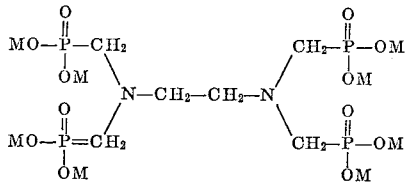

where at least one M represents a valence bond of a polyvalent metal and the balance are independently selected from the group consisting of H, NH$_4$, alkali metal, the amount of said compound added being a threshold amount in a weight ratio of said compound to the cation component of said scale-forming salts not in excess of 0.5 to 1, and which amount is less than that which cause turbidity removable by a sequestering amount of said compound.

16. A method of inhibiting the precipitation of scale-forming salts in an aqueous system comprising adding to said system a compound of the formula

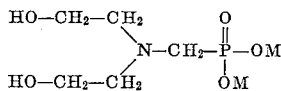

where at least one M represents a valence bond of a polyvalent metal and the balance are independently selected from the group consisting of H, NH$_4$, alkali metal, the amount of said compound added being a threshold amount in a weight ratio of said compound to the cation component of said scale-forming salts not in excess of 0.5 to 1, which amount is less than that which would cause turbidity removable by a sequestering amount of said compound.

17. A method of inhibiting the precipitation of scale-forming salts in a water system comprising adding to said system no more than a threshold amount of a compound of the general formula

where R is

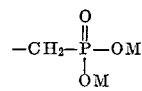

R' is selected from the group consisting of R and —CH$_2$CH$_2$OH, and R" is selected from the group consisting of R, —CH$_2$CH$_2$OH, and

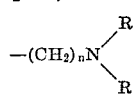

where at least one M represents a valence bond of a polyvalent metal and the balance are independently selected from the group consisting of H, NH$_4$ and alkali metal, $n$ is a whole number from 1 to 6.

18. A method of inhibiting the precipitation of scale-forming salts in an aqueous system comprising adding to said system a compound of the general formula

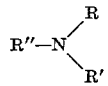

where R is

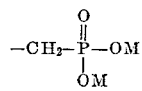

R' is selected from the group consisting of R and

—$CH_2CH_2OH$, and R″ is selected from the group consisting of R, —$CH_2CH_2OH$, and

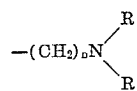

where at least one M represents a valence bond of a polyvalent metal and the balance are independently selected from the group consisting of H, $NH_4$, and alkali metal, $n$ is a whole number from 1 to 6, the amount of said compound added being a threshold amount in a weight ratio of said compound to the cation component of said scale-forming salts not in excess of 0.5 to 1, and which amount is less than that which would cause turbidity removable by a sequestering amount of said compound.

References Cited
UNITED STATES PATENTS

| | | | |
|---|---|---|---|
| 2,599,807 | 6/1952 | Bersworth | 260—500 |
| 2,841,611 | 7/1958 | Bersworth | 260—500 |
| 2,917,528 | 12/1959 | Ramsey et al. | 260—500 X |
| 3,160,632 | 12/1964 | Toy et al. | 252—180 |
| 3,234,124 | 2/1966 | Irani | 210—58 |

MICHAEL E. ROGERS, *Primary Examiner.*

UNITED STATES PATENT OFFICE
CERTIFICATE OF CORRECTION

Patent No. 3,393,150                                      July 16, 1968

Paul H. Ralston

It is certified that error appears in the above identified patent and that said Letters Patent are hereby corrected as shown below:

Column 5, lines 32 to 40, the formula should appear as shown below:

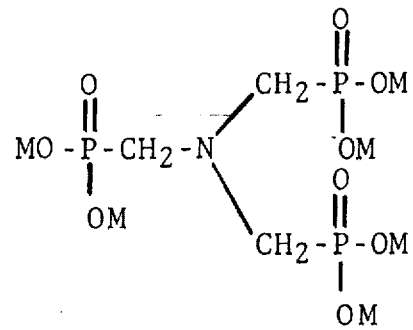

same column 5, lines 48 to 57, the lower left-hand portion of the formula should appear as shown below:

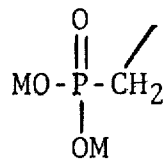

Column 6, line 71, "grounp" should read -- group --. Column 7, lines 57 to 64, the left-hand portion of the formula should appear as shown below:

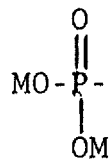

Column 8, lines 3 to 9, the lower left-hand portion of the formula should appear as shown below:

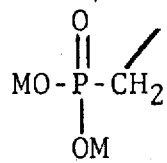

Signed and sealed this 23rd day of December 1969.

(SEAL)
Attest:

EDWARD M. FLETCHER, JR.                    WILLIAM E. SCHUYLER, JR.
Attesting Officer                                     Commissioner of Patents